Dec. 23, 1947.    J. P. FELLABAUM    2,433,269
TRANSPORTATION VEHICLE
Filed Jan. 25, 1945    3 Sheets-Sheet 1
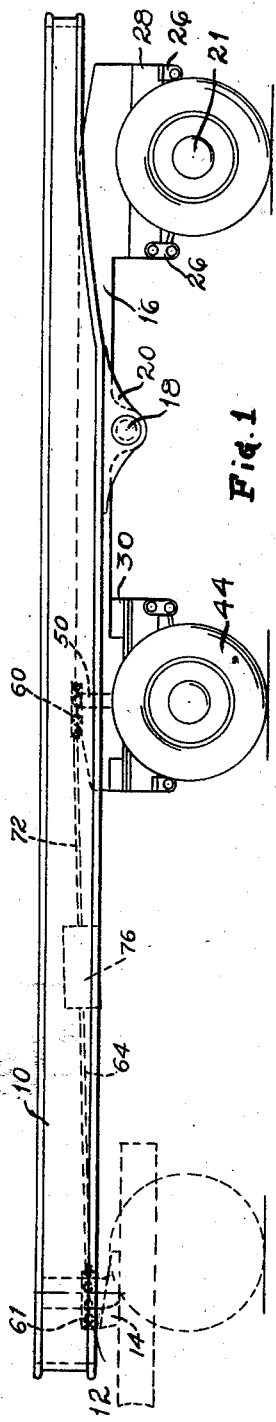

Dec. 23, 1947.  J. P. FELLABAUM  2,433,269
TRANSPORTATION VEHICLE
Filed Jan. 25, 1945  3 Sheets-Sheet 2

Dec. 23, 1947.                J. P. FELLABAUM                2,433,269
                           TRANSPORTATION VEHICLE
                            Filed Jan. 25, 1945                3 Sheets—Sheet 3

Patented Dec. 23, 1947

2,433,269

UNITED STATES PATENT OFFICE 2,433,269

TRANSPORTATION VEHICLE

John Phil Fellabaum, Warren, Ohio

Application January 25, 1945, Serial No. 574,564

19 Claims. (Cl. 280—33.5)

This invention relates to a transportation unit and more particularly to a transportation unit including steerable wheels that are not utilized in guiding the transportation unit.

In order to conserve on highways, a number of states have found it necessary to enact regulations as to the loading of trucks and trailers. This has resulted in inefficient operation of many types of trucks and trailers, for the reason that the regulations definitely limit the load that may be carried upon a particular vehicle, depending upon the arrangement of the axles.

An object of this invention is to provide a trailer wherein the maximum load may be carried with the use of a minimum amount of equipment, to thereby obtain the optimum load for the length of the vehicle.

Another object of this invention is to provide a trailer or semi-trailer that is provided with a bogie truck having two axles, one of which is mounted so that it cannot be steered and the other is mounted so that it can be steered, the oscillatory movements being governed by the direction of movement of the vehicle used in pulling the trailer, so that when turning, the wheels turn without skidding or sliding.

Another object of this invention is to provide a trailer having one end adapted to be supported on a pair of wheels connected to the vehicle or forming a part of the vehicle used in towing the trailer, said trailer being associated with a second pair of wheels that are not steered but cooperate with the towing vehicle in steering the trailer and one or more sets of wheels associated with the trailer adapted to be guided so as to follow a curved path or curved paths when the trailer negotiates a curved path, which curved path is governed by the fixed wheels and the direction of movement of the towing vehicle.

Other objects and advantages reside in the construction of parts, the combination thereof and the mode of operation, as will become more apparent from the following description.

In the drawings,

Figure 1 is a side elevational view of a trailer.

Figure 2 is a top plan view of the trailer shown in Figure 1.

Figure 3 is a rear end elevational view.

Figure 8 is a fragmentary sectional view of a modification.

Numerous attempts have been made to improve upon trailers so as to obtain greater efficiency in hauling freight and preserving the highways. In some of these devices the structure is too complicated or for some other reason the structure has not been acceptable to the trade.

In the device disclosed herein a pair of axles is mounted under the bogie truck that is pivotally attached to the main body of the trailer in such a manner that one set of wheels mounted on one axle does not swing or steer. The trailer is steered by the tractor or other vehicle used in pulling the trailer. The adjustable wheels of the bogie truck are caused to follow a curved path when negotiating a curve, such that the adjustable wheels under the bogie truck do not skid or slip. These adjustable wheels under the bogie truck do not in any manner steer the trailer; but merely follow the desired curved path, whether the trailer moves forward or backward. In my Patent No. 2,333,853 a caster-like bogie truck was used, castering at least one axle wherein the axle was offset from the king bolt. This works satisfactorily under ideal conditions; but has a tendency to cause the wheels to swerve when one of the wheels of the caster truck or bogie truck strikes an obstruction. By providing a positive means for guiding the front wheels under the bogie truck, obstructions in the path of one of the wheels of the bogie truck will not cause a swerve.

Figure 4:
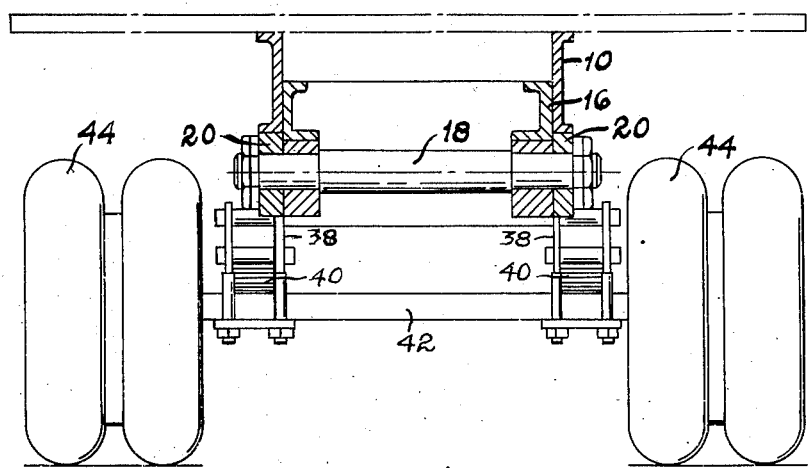
Figure 4 is a cross sectional view taken substantially on the line 4—4 of Figure 2.
Figure 5:
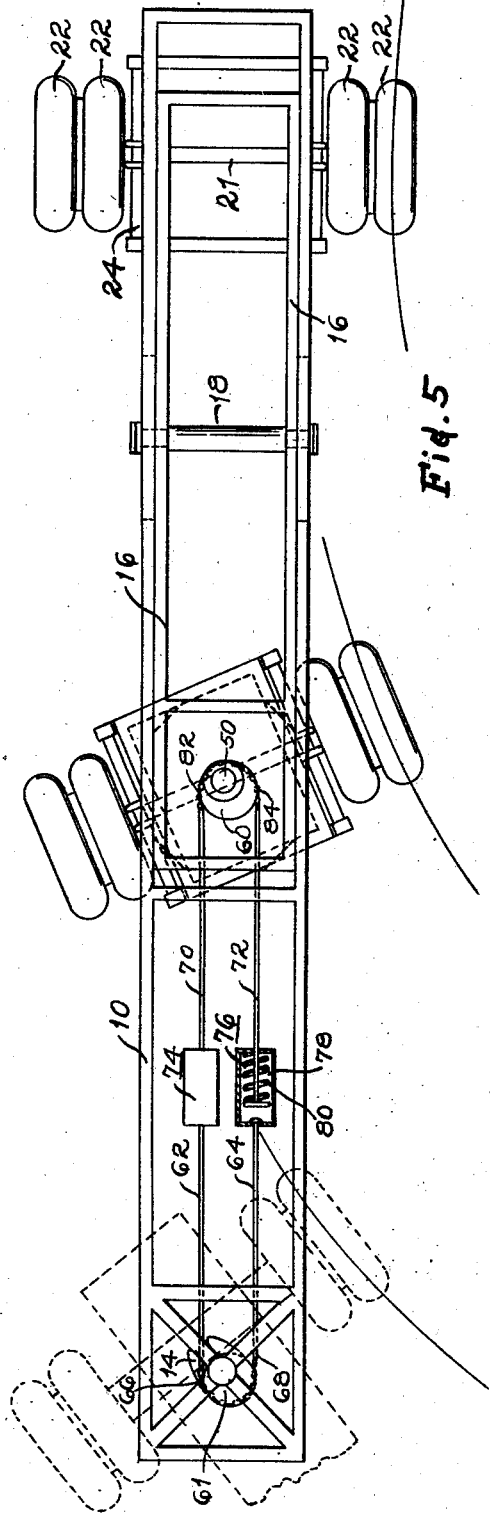
Figure 5 shows the trailer in the process of negotiating a curve or turn.

Referring to the drawings, the reference character 10 indicates the main body of a trailer. This trailer has been shown for the purpose of illustrating the invention. The front end of the main body or chassis 10 is provided with a fifth wheel member 12 cooperating with another fifth wheel member 14 on the tractor used in pulling the trailer. The rear end of the chassis 10 has mounted thereunder a bogie truck 16, which bogie truck is mounted for oscillatory movement about a shaft or pivot 18 having its end fixedly attached to the brackets 20 mounted underneath the chassis 10. As best shown in Figures 2, 4 and 5, the frame of the bogie truck is mounted for sliding movement with respect to the main body 10, so that when the trailer negotiates a curve, the main body 10 swings the bogie truck with it, so as to relieve torque forces acting on the pivot 18.

The bogie truck 16 is provided with a rear axle 21 supporting two pairs of rear wheels 22. The axle is mounted through suitable springs 24 and shackles 26 to a suitable frame member 28 fixedly mounted underneath the frame of the bogie 16. The rear axle 21 is mounted in a fixed position relative to the frame member 28 except for the movement permitted by the springs 24 and cannot be used for steering the rear wheels 22. In other words, the plane of rotation of the wheels 22 is always parallel to the longitudinal axis of the chassis 10.

Figure 7:
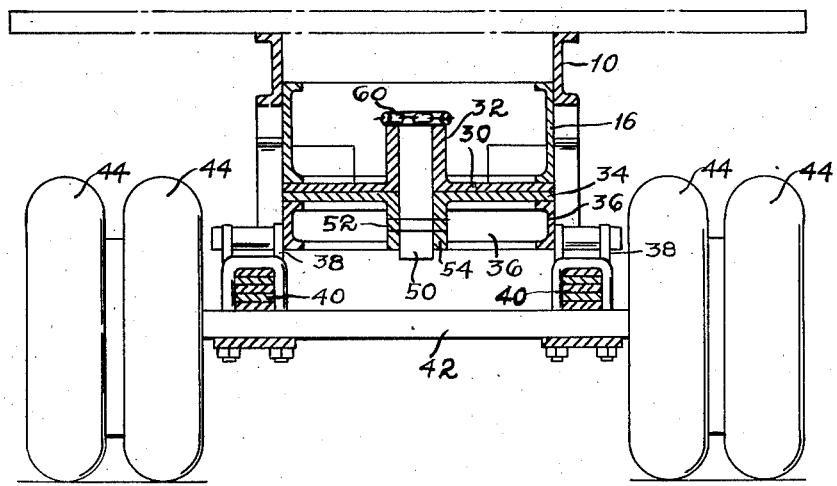
Figure 7 is a cross sectional view taken substantially on the line 7—7 of Figure 2.

The forward end of the bogie truck 16 is provided with a plate 30, as best seen in Figure 7, provided with a boss 32. Underneath the plate 30 there is another plate 34 fixedly attached to the channel beams 36, extending throughout the margin of the plate 34 and providing supports for the shackles 38, having pivotally mounted thereto the springs 40, supporting an axle 42 provided with two pairs of wheels 44.

A king bolt 50 is fixedly attached to the plate 34 and is keyed by a suitable key 52 to a boss 54 integral with the plate 34. The upper end of the king bolt 50 is provided with a cam 60 that will be described more fully later. The wheels 44, together with the axle 42, may oscillate about a vertical axis concentric with the axis of the king bolt 50, so that when the truck turns, the wheels 44 will turn so as to follow the trailer without skidding and without slipping. A suitable mechanism for steering the wheels 44 located near the center of the trailer will now be described.

When a vehicle having a plurality of steerable axles negotiates a curve, the pairs of wheels, if there is no slippage, will follow curved paths. As may best be seen by referring to Figure 5, the rear wheels will follow a curved path having a shorter radius of curvature than the radius of curvature of the path swept out by the center wheels and the radius of curvature of the rear wheels of the tractor will be the greatest. The rear wheels of the tractor are controlled by the steering wheels of the tractor, which have not been shown, as is well known to those skilled in the art. The rear wheels of the trailer are fixed with respect to the trailer, so that the radius of curvature of the paths of the rear wheels of the trailer is determined by the movement of the tractor.

It so happens that the center wheels 44 and the axle 42 must be controlled or steered so that these will follow a path having the proper radius of curvature if these wheels are not to slip or slide on the highway, roadbed or whatever the surface may be. The center wheels 44 and the axle 42 are guided in response to the angular position of the tractor.

As best shown in Figure 5, the fifth wheel 14 on the tractor is mounted for rotation with the tractor. A suitable cam 61 is mounted for rotation with the fifth wheel 14 through any suitable mechanism. The cam 61 actuates a pair of rods 62 and 64 through suitable chains 66 and 68 adapted to be wound upon and unwound from the cam 61. The rods 62 and 64 are connected to rods 70 and 72 through suitable spring coupling units 74 and 76 respectively. Each of these coupling units includes a housing 78 and a helical compression spring 80. The purpose of the compression units 74 and 76 will now be described.

Figure 6:
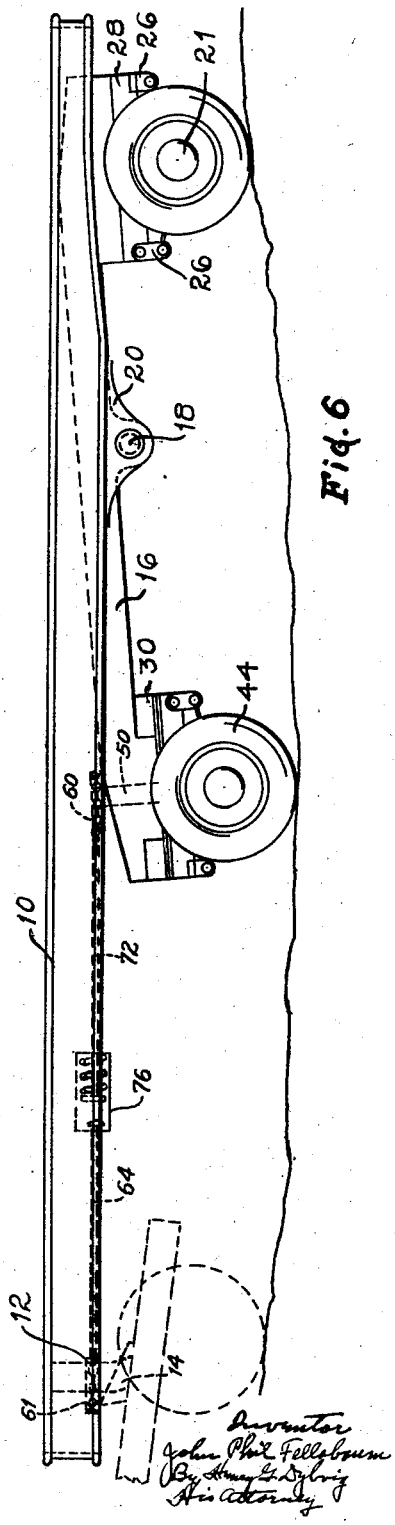
Figure 6 shows the trailer traveling over rough and irregular ground.

The bogie truck 16 may oscillate about the pivot 18, so as to accommodate irregularities in the highway, as shown in Figure 6. Referring to the mathematical maxim, the shortest distance between two points is a straight line, it may be readily seen that the length of the rods connecting the cams 60 and 61 will vary as the bogie truck oscillates about the pivot 18. In order to adjust or take up slack in the rods, the compression springs 80 maintain the rods taut at all times and at the same time permit oscillatory movement of the bogie truck without creating undue strains and stresses.

The rods 70 and 72 are connected through a pair of chains 82 and 84 to the cam 60 mounted for rotation with the king bolt 50. The cams 60 and 61 are so designed that as the tractor turns with respect to the trailer, as shown for example in Figure 5, the cam 61 will drive the cam 60 through the rods. No attempt has been made to illustrate the details of the cams 60 and 61 for the reason that the design of these cams is dependent upon the relative position of the wheels to be guided, the length of the trailer, et cetera.

Figure 9:
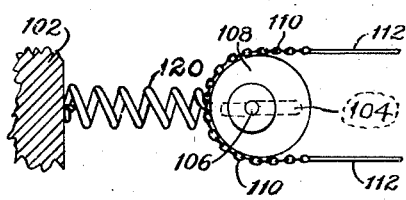
Figure 9 is a fragmentary top plan view of the control mechanism shown in the modification disclosed in Figure 8.

In Figures 8 and 9 a preferred modification has been shown, wherein the compression units in the rods have been eliminated. Instead of putting compression units in the rods, the axle and wheels to be steered under the trailer are associated with a king bolt 106 that projects through and is mounted in a slot 104 so as to permit sliding movement of the king bolt in the slot to compensate for variation in the distance between the controlling set of wheels and the controlled wheels, which distances change whenever the wheels shift relative levels.

Referring to Figure 8, a plate 100 mounted to the channel-beam 102 attached to the bogie frame 16, is provided with a slot 104 extending longitudinally, as shown in Figure 9. A king bolt 106 passes through the slot and is provided with a cam 108 having trained thereover chains 110 connected to rods 112. Whenever the wheels 114 pass over irregularities in the highway, longitudinal movement of the axle 116 and the parts carried thereby is permitted through the slot 104. In order to maintain the rods 112 taut at all times, a spring 120 mounted between the frame 102 and the top of the king bolt 106 exerts a pull towards the rear of the trailer.

Instead of using a fixed rear axle and an adjustably mounted front axle under the bogie truck, this arrangement could be reversed, so as to guide the rear wheels without steering the trailer. The purpose of steering such adjustably mounted rear wheels is to prevent skidding without any attempt to thereby steer the trailer. The trailer is steered by the permanent set of wheels and the direction of movement of the trailer.

In the device shown, wheels under one trailer associated with a bogie truck have been utilized. Instead of a bogie truck, an articulated trailer assembly could be used, as for example, the trailer assembly shown in Fig. 1 of my Patent No. 2,333,853.

When the tractor and trailer assembly negotiate a curve, the wheels, in the absence of changing the course of the tractor, generate circular curved paths such that all of the circles are concentric in the absence of slippage of the wheels. Whenever the course of the tractor is changed, the radii of curvature of the several curves will change. By providing proper connecting means between the steerable wheels and the tractor or the towing vehicle, whatever it may be, the concentric circular curves are generated without any appreciable slippage of any of the wheels. The towing vehicle may be a separate vehicle or it may consist of a pair of wheels mounted through a fifth wheel underneath the front end of the trailer assembly and provided with some type of a connecting means connecting these wheels to the prime mover, either directly or indirectly.

The principle of steering the steerable wheels has been shown and described in connection with trailers or semi-trailers. For example, the steerable wheels could be mounted under one trailer unit and the non-steerable wheels under another trailer unit, the two trailer units being connected through a hinge connection such that there is no lateral displacement of the two units. Furthermore, the principle of the steerable wheels and the non-steerable wheels may be incorporated into a truck having the prime mover mounted therein. The principle shown in connection with the trailer may be applicable to tandem trucks and other transportation units having a plurality of axles supporting the load. It has been shown for the purpose of illustration as applied to a trailer assembly.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a trailer assembly for use with a tractor having a fifth wheel, a bogie truck mounted for oscillatory movement with respect to the trailer so as to accommodate variations in the highway, said bogie truck having rear wheels mounted on an axle on the rear end thereof fixedly mounted so that the wheels rotate in a plane substantially parallel to the longitudinal axis of the bogie truck, and a pair of front wheels under the front end of the bogie truck, an axle for the front wheels, said axle for the front wheels being pivotally mounted with respect to the bogie truck so as to permit steering thereof, and means for interconnecting the pivotally mounted axle to the fifth wheel, said means having compensating mechanism so that the front wheels on the bogie truck follow a path consistent with the curved paths of the rear wheels.

2. In a trailer assembly for use with a tractor having a fifth wheel member, the combination including a bogie truck having a pair of rear wheels and an axle for the rear wheels, the axle being fixedly mounted with respect to the bogie truck so that the planes of rotation of the rear wheels extend parallel to the longitudinal axis of the bogie truck, and front wheels for the bogie truck, an axle for the front wheels, said axle being pivotally mounted to the bogie truck so as to permit steering of the front wheels, and steering mechanism for the front wheels, said steering mechanism including means interconnected to the fifth wheel member fixedly mounted on the tractor so that as the tractor negotiates a curve the front wheels of the bogie truck negotiate curves consistent with the movement of the trailer assembly.

3. A trailer assembly for use with a towing vehicle having a fifth wheel member, means for connecting the trailer assembly to the fifth wheel member, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, said bogie truck including non-steerable wheels for supporting the rear end of the bogie truck, a pair of steerable wheels mounted underneath the front end of the frame of the bogie truck, said steerable wheels being located near the center of the trailer assembly, and means responding to the angular relation laterally between the towing vehicle and the trailer assembly for steering said steerable wheels so as to cause said steerable wheels to negotiate a curve without slippage when the towing vehicle turns.

4. A trailer assembly for use with a towing vehicle having interconnecting means, means for connecting the trailer assembly to the interconnecting means, said trailer assembly including a pair of parallel main frame members, a bogie truck having a pair of frame members slidably engaging the main frame members, means for pivotally attaching the bogie truck to the main frame members so as to permit the bogie truck to oscillate with respect to the main frame members, said bogie truck including non-steerable wheels for supporting the rear end of the bogie truck, a pair of steerable wheels mounted underneath the front end of the frame of the bogie truck, said steerable wheels being located near the center of the trailer assembly, and means responding to the angular relation laterally between the towing vehicle and the trailer assembly for steering said steerable wheels so as to cause said steerable wheels to negotiate a curve without slippage when the towing vehicle turns, said last mentioned means including yieldable means permitting oscillation of the bogie truck to accommodate irregularities in the elevation of the highway.

5. A trailer assembly for use with a towing vehicle having a fifth wheel member, means for connecting the trailer assembly to the fifth wheel member, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, said bogie truck including non-steerable supporting means for supporting the rear end of the bogie truck, steerable means mounted underneath the front end of the bogie truck, and means responding to the angular relation laterally between the towing vehicle and the trailer assembly for steering the steerable means so as to cause the steerable means to negotiate a curve without lateral slippage when the trailer turns.

6. A trailer assembly for use with a towing vehicle having a fifth wheel member, means for connecting the trailer assembly to the fifth wheel member, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, said bogie truck including non-steerable supporting means for supporting the rear end of the bogie truck, steerable means mounted underneath the front end of the bogie truck, and means responding to the angular relation laterally between the towing vehicle and the trailer assembly for steering the steerable means so as to cause the steerable means to negotiate a curve without lateral slippage when the trailer turns, said means responding to the angular relation including adjustable means permitting oscillation of the bogie truck to accommodate irregularities in the highway.

7. A trailer assembly for use with a towing vehicle having a fifth wheel member, means for connecting the trailer assembly to the fifth wheel member, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, said bogie truck including non-steerable supporting means rotatably mounted for supporting the rear end of the bogie truck, steerable means rotatably mounted for supporting the front end of the bogie truck, and means responding to the angular relation laterally between the towing vehicle and the trailer assembly for steering the steerable means so as to cause the steerable means to negotiate a curve without lateral slippage when the trailer turns.

8. A trailer assembly for use with a towing vehicle having a fifth wheel member, means for connecting the trailer assembly to the fifth wheel member, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, said bogie truck including non-steerable supporting means rotatably mounted for supporting the rear end of the bogie truck, steerable means rotatably mounted for supporting the front end of the bogie truck, and means responding to the angular relation laterally between the towing vehicle and the trailer assembly for steering the steerable means so as to cause the steerable means to negotiate a curve without lateral slippage when the trailer turns, said means responding to the angular relation including adjustable means permitting oscillation of the bogie truck to accommodate irregularities in the highway.

9. A trailer assembly for use with a towing vehicle having interconnecting means, means for connecting the trailer assembly to the interconnecting means, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, supporting means for supporting the rear end of the bogie truck, steerable means mounted underneath the front end of the bogie truck, and means responding to the angular relation laterally between the towing vehicle and the trailer assembly for steering the steerable means so as to cause the steerable means to negotiate a curve without lateral slippage when the trailer turns.

10. A trailer assembly for use with a towing vehicle having interconnecting means, means for connecting the trailer assembly to the interconnecting means, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, supporting means for supporting the rear end of the bogie truck, steerable means mounted underneath the front end of the bogie truck, and means responding to the angular relation laterally between the towing vehicle and the trailer assembly for steering the steerable means so as to cause the steerable means to negotiate a curve without lateral slippage when the trailer turns, said means responding to the angular relation including adjustable means permitting oscillation of the bogie truck to accommodate irregularities in the highway.

11. A trailer assembly for use with a towing vehicle having interconnecting means, means for connecting the trailer assembly to the interconnecting means, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, supporting means rotatably mounted for supporting the rear end of the bogie truck, steerable means rotatably mounted for supporting the front end of the bogie truck, and means responding to the angular relation laterally between the towing vehicle and the trailer assembly for steering the steerable means so as to cause the steerable means to negotiate a curve without lateral slippage when the trailer turns.

12. A trailer assembly for use with a towing vehicle having interconnecting means, means for connecting the trailer assembly to the interconnecting means, said trailer assembly including a pair of parallel main frame members, a bogie truck having a pair of frame members slidingly engaging the main frame members, means for pivotally attaching the bogie truck to the main frame members so as to permit the bogie truck to oscillate with respect to the main frame members, supporting means rotatably mounted for supporting the rear end of the bogie truck, steerable means rotatably mounted for supporting the front end of the bogie truck, and means responding to the angular relation laterally between the towing vehicle and the trailer assembly for steering the steerable means so as to cause the steerable means to negotiate a curve without lateral slippage when the trailer turns, said means responding to the angular relation including adjustable means permitting oscillation of the bogie truck to accommodate irregularities in the highway.

13. A trailer assembly connected to a towing vehicle, the combination including a trailer having a pair of pivotally interconnected frame members, said frame members having sides laterally engaging each other for sliding movement, means for connecting one of the frame members to the towing vehicle, a pair of non-steerable wheels, means for supporting the non-steerable wheels to one of the frame members to support a portion of the load, a pair of steerable wheels, means for supporting the steerable wheels underneath one of the frame members, and steering means responding to turning movements of the trailer for causing the steerable wheels to negotiate a curve while turning without lateral slippage.

14. In a trailer assembly for use with a towing vehicle having a fifth wheel member, means for connecting the trailer assembly to the fifth wheel member, said trailer assembly including main frame members, a bogie truck, means for pivotally attaching the bogie truck to the main frame members so as to permit the bogie truck to oscillate with regard to the main frame members to accommodate for variations in the highway, said bogie truck including non-steerable wheels for supporting the rear end of the bogie truck, a pair of steerable wheels mounted underneath the front end of the bogie truck, said steerable wheels being located near the center of the trailer assembly, and means responding to the angular relation laterally between the towing vehicle and the trailer assembly for steering said steerable wheels so as to cause said steerable wheels to negotiate a curve without slippage when the towing vehicle turns.

15. A highway transportation unit including a tractor having a fifth wheel, a trailer assembly including main frame members having the front ends thereof attached to the fifth wheel, a bogie truck pivotally mounted underneath the main frame members, said bogie truck being provided with a pair of non-steerable rear wheels and a pair of steerable front wheels, the rear wheels and the front wheels under the bogie truck being mounted in sufficiently spaced relation to distribute the load carried by the bogie truck over different portions of the highway, and means responding to the turning movement of the tractor for steering the steerable wheels under the bogie truck so as to cause the trailer to follow the tractor without slippage of the wheels, said last mentioned means including a cam mounted on the fifth wheel, a second cam mounted for movement to steer the steerable wheels, cable means for connecting the two cams and means for compensating for variations in the distance between the fifth wheel and the steerable wheels which variations are caused by irregularities in the highway.

16. A highway transportation assembly including a tractor, said tractor having steerable wheels, a load-carrying unit adapted to be towed by the tractor, said load-carrying unit including frame members, means for attaching the front ends of the frame members to the tractor, a bogie truck, means for pivotally attaching the bogie truck to the frame members so as to permit the bogie truck to oscillate with respect to the frame members to accommodate variations in the highway, a pair of non-steerable wheels mounted on the rear end of the bogie truck, a pair of steerable wheels mounted near the front end of the bogie truck, the front and rear wheels of the bogie truck being mounted in a substantial spaced relation from each other so as to distribute the load carried by the bogie truck over different sections of the highway, and means responding to turning movements of the tractor for steering the steerable wheels under the bogie truck so as to cause the steerable wheels under the bogie truck to negotiate a curve without slippage when the tractor turns.

17. A highway transportation assembly including a motor, a pair of steerable wheels mounted under the motor, said transportation assembly including a frame, a bogie truck pivotally mounted to the frame, said bogie truck having a pair of rear non-steerable wheels, a pair of steerable front wheels mounted near the front end of the bogie truck, the steerable front wheels of the bogie truck being mounted a substantial distance away from the rear wheels, and means responding to the steerable wheels under the motor for steering the steerable wheels on the front end of the bogie truck so that as the transportation assembly negotiates a curve the steerable wheels under the bogie truck will turn without slippage.

18. A trailer assembly for use with a towing vehicle and interconnecting means, means for connecting the trailer assembly to the interconnecting means, said trailer assembly including frame means, a bogie truck, means for pivotally attaching the bogie truck to the frame means so as to permit the bogie truck to oscillate with respect to the frame, supporting means rotatably mounted for supporting one end of the bogie truck, steerable means rotatably mounted for supporting the other end of the bogie truck, and means responding to the angular relation laterally between the towing vehicle and the trailer assembly for steering the steerable means so as to cause the steerable means to negotiate a curve without lateral slippage of the rotatable supporting means when the trailer turns, said means responding to the angular relation including compensating mechanism permitting oscillation of the bogie truck to accommodate for irregularities in the highway.

19. In a transportation unit, a vehicle body, a bogie truck mounted for oscillatory movement with respect to said vehicle body so as to accommodate for variations in the highway, said bogie truck having rear wheel means under the rear of said bogie truck and front wheel means under the front of said bogie truck, one of said wheel means being pivotally mounted with respect to the bogie truck so as to permit steering thereof, steering mechanism for said last mentioned wheel means, means for guiding the front end of said vehicle body including pivotally supported guiding member carried by said vehicle body and means for interconnecting said steering mechanism to said guiding member, said interconnecting means having compensating mechanism so that the wheel means on the bogie truck follow a path consistent with the movement of the vehicle body irrespective of said oscillatory movement of said bogie truck relative to said vehicle body.

JOHN PHIL FELLABAUM.

REFERENCES CITED

The following references are of record in the file of this patent:

UNITED STATES PATENTS

| Number | Name | Date |
|---|---|---|
| 2,167,943 | Fox | Aug. 1, 1939 |
| 2,223,436 | Winn | Dec. 3, 1940 |
| 1,629,597 | Stockford | May 24, 1927 |
| 2,286,166 | Carmody | June 9, 1942 |

FOREIGN PATENTS

| Number | Country | Date |
|---|---|---|
| 70,748 | Austria | Nov. 25, 1915 |
| 5,983 | Great Britain | Mar. 12, 1906 |
| 787,127 | France | Sept. 17, 1935 |